(12) United States Patent
Park et al.

(10) Patent No.: US 8,351,304 B2
(45) Date of Patent: Jan. 8, 2013

(54) NEAR-FIELD OPTICAL HEAD AND INFORMATION RECORDING/REPRODUCING DEVICE

(75) Inventors: Majung Park, Chiba (JP); Manabu Oumi, Chiba (JP); Masakazu Hirata, Chiba (JP)

(73) Assignee: Seiko Instruments Inc. (JP)

( * ) Notice: Subject to any disclaimer, the term of this patent is extended or adjusted under 35 U.S.C. 154(b) by 532 days.

(21) Appl. No.: 12/452,098

(22) PCT Filed: Jun. 13, 2008

(86) PCT No.: PCT/JP2008/060819
§ 371 (c)(1),
(2), (4) Date: Feb. 1, 2010

(87) PCT Pub. No.: WO2008/156028
PCT Pub. Date: Dec. 24, 2008

(65) Prior Publication Data
US 2011/0122736 A1    May 26, 2011

(30) Foreign Application Priority Data
Jun. 21, 2007    (JP) .................................. 2007-163572

(51) Int. Cl.
*G11B 11/00*    (2006.01)
(52) U.S. Cl. .................................. 369/13.33; 369/13.17
(58) Field of Classification Search ............... 369/13.17, 369/13.02, 13.33, 13.32, 13.24, 13.03, 112.27, 369/112.01, 112.23; 360/59, 125.31, 125.02, 360/125.74; 250/201.3, 216, 306
See application file for complete search history.

(56) References Cited

U.S. PATENT DOCUMENTS

| | | | | |
|---|---|---|---|---|
| 6,649,894 | B2 * | 11/2003 | Matsumoto et al. | 250/201.3 |
| 7,034,277 | B2 * | 4/2006 | Oumi et al. | 250/216 |
| 7,372,648 | B2 * | 5/2008 | Akiyama et al. | 369/13.33 |
| 8,050,170 | B2 * | 11/2011 | Park et al. | 369/112.23 |

* cited by examiner

*Primary Examiner* — Ali Neyzari
(74) *Attorney, Agent, or Firm* — Adams & Wilks

(57) ABSTRACT

A near-field optical head includes: a near-field light generating element, formed on a counter surface of a slider facing the surface of a magnetic recording medium and having two or more side surfaces each of which are in contact with the counter surface at a certain angle with the counter surface, for generating the near-field light; at least one lower wiring formed on at least one of the side surfaces of the near-field light generating element; a thin-film-like magnetic pole disposed to a position covering the lower wiring; at least one upper wiring disposed on one of the two sides of the magnetic pole, opposite to the side on which the lower wiring is disposed; at least one side surface wiring connecting the lower wiring and the upper wiring; insulating layers insulating each of the lower wiring, the magnetic pole, and the upper wiring from the others; and a coil wound around the magnetic pole by connecting the lower wiring and the upper wiring alternately and serially using the side surface wiring.

6 Claims, 9 Drawing Sheets

DISK MOVING DIRECTION

DISK MOVING DIRECTION

DISK MOVING DIRECTION

NEAR-FIELD OPTICAL HEAD AND INFORMATION RECORDING/REPRODUCING DEVICE

CROSS-REFERENCE TO RELATED APPLICATIONS

This application is a U.S. national stage application of International Application No. PCT/JP2008/060819, filed Jun. 13, 2008, claiming a priority date of Jun. 21, 2007, and published in a non-English language.

TECHNICAL FIELD

The present invention relates to a near-field optical head and an information recording/reproducing device having the near-field optical head that can record various information to a magnetic recording medium at ultrahigh density using near-field light.

BACKGROUND ART

In recent years, storage capacity of a hard disk and the like in a computer apparatus has increased, which has increased the density of information recording on a single recording surface. For example, in order to increase the recording capacity in a magnetic disk, the surface recording density needs to be increased. However, as the recording density increases, the recording area occupied by one bit on the recording medium decreases. When this bit size is reduced, the potential energy of the state in which one bit information is recorded becomes close to the thermal energy at room temperature, which may cause a thermal demagnetization problem in which, for example, recorded information is inverted or lost due to thermal fluctuation or the like.

An in-plane recording method that has been widely used is to record magnetism such that the direction of magnetization is parallel to the surface of the recording medium. However, this method may easily cause the loss of recorded information or the like due to the above-described thermal demagnetization. Thus, in order to resolve this problem, the recording method is shifting toward a perpendicular recording method to record magnetization signal in the direction perpendicular to the surface of the recording medium. This method is to record magnetic information by moving a magnetic monopole closer to the recording medium. This method causes the recording magnetic field to be almost perpendicular to a recording film. Information recorded with a perpendicular magnetic field tends to keep stable in energy, because it is difficult for the north pole and the south pole to form a loop on the surface of the recording film. In this regard, the perpendicular recording method is more resistant to thermal demagnetization than the in-plane recording method.

However, for a modern recording medium, further increase in density is needed to meet a demand for recording/reproducing even larger amount and higher density of information. To this end, in order to minimize the influence between adjacent magnetic domains and the thermal fluctuation, high-coercivity materials are beginning to be used as a recording medium. This makes it difficult to record information to the recording medium even if the above-described perpendicular recording method is used.

Thus, in order to resolve this problem, a hybrid magnetic recording method (near-field light assisted magnetic recording method) is suggested, which is to locally heat a magnetic domain with near field light to temporarily reduce the coercivity and perform writing while the coercivity is reduced.

The hybrid magnetic recording method uses near-field light generated by the interaction between a very small area and an optical aperture of a size equal to or less than the wavelength of light, formed on a near-field optical head. In this manner, using a very small optical aperture exceeding the diffraction limit of light, that is, a near-field optical head having a near-field light generating element, it is possible to heat one of the areas the size of each of which is equal to or smaller than the wavelength of light, which is the limit for conventional optical systems. This can provide recording bits with higher density than that can be provided by conventional optical information recording/reproducing devices.

Note that the near-field light generating element is not limited to the one with the very small optical aperture as described above, but may also be one with a protruding portion formed in nanometer size, for example. This protruding portion can also generate near-field light as the very small optical aperture can.

Various recording heads using the hybrid magnetic recording method described above are provided. One of them that is known is a magnetic recording head that reduces the size of light spot to increase the recording density (see JP-A-2004-158067 and JP-A-2005-4901, for example).

This magnetic recording head generally includes: a main magnetic pole; an auxiliary magnetic pole; a coil winding in which a conductive pattern is provided in a spiral shape in the same plane, the main magnetic pole passing along the central axis of the spiral shape, the conductive pattern being formed within an insulating material; a metal scatterer for generating near-field light from radiated laser light; a planar laser light source for radiating laser light toward the metal scatterer; and a lens for focusing the radiated laser light. These components are mounted on the tip surface of a slider fixed to the tip of a beam.

One end of the main magnetic pole is a surface facing a recording medium, while the other end is connected to the auxiliary magnetic pole. In other words, the main magnetic pole and the auxiliary magnetic pole form a magnetic-monopole-type perpendicular head that is one magnetic pole (magnetic monopole) disposed in a perpendicular direction. Also, the coil winding is fixed to the auxiliary magnetic pole with a portion of the coil winding passing through between the main magnetic pole and the auxiliary magnetic pole. The main magnetic pole, the auxiliary magnetic pole, and the coil winding form an electromagnet as a whole.

The metal scatterer including gold and the like is mounted on the tip of the main magnetic pole. The planar laser light source is disposed spaced from the metal scatterer. The lens is disposed between the planar laser light source and the metal scatterer.

For the above-described components, the auxiliary magnetic pole, the coil winding, the main magnetic pole, the metal scatterer, the lens, and the planar laser light source are mounted in this order from the tip surface of the slider.

The magnetic recording head configured in this way records various information to the recording medium by applying recording magnetic field while generating near-field light.

Specifically, the planar laser light source radiates laser light. This laser light is focused by the lens and then applied to the metal scatterer. Then free electrons within the metal scatterer are caused to uniformly vibrate by the electric field of the laser light, which excites plasmons to generate near-field light at the tip portion of the metal scatterer. Consequently, a magnetic recording layer of the recording medium is locally heated by the near-field light, with its coercivity temporarily reduced.

Also, by supplying drive current to the conductive pattern of the coil winding while radiating the laser light, the recording magnetic field is locally applied to the magnetic recording layer of the recording medium near the main magnetic pole. This allows various information to be recorded to the magnetic recording layer with its coercivity temporarily reduced. Thus, recording to the recording medium can be performed by the cooperation of the near-field light and the magnetic field.

Another known magnetic recording head includes an additional preheating mechanism combined with the above-described magnetic recording head (see JP-A-2005-78689, for example).

This magnetic recording head includes a resistance heater as the preheating mechanism between the above-described main magnetic pole and auxiliary magnetic pole. The area of the tip of this resistance heater is larger than that of the main magnetic pole and the auxiliary magnetic pole, and accordingly, the resistance heater can heat a large area and has a low temperature gradient. So, the resistance heater is configured to be able to apply heat that is only a preheating level to the magnetic recording layer of the recording medium.

The magnetic recording head configured in this way can preheat the magnetic recording layer in advance with the resistance heater, which can reduce the heat generation at the metal scatterer generating the near-field light. As a result, the degradation, possibility of damage and the like of the metal scatterer due to an increased temperature can be reduced to improve the endurance.

Patent Document 1: JP-A-2004-158067
Patent Document 2: JP-A-2005-4901
Patent Document 3: JP-A-2005-78689

DISCLOSURE OF THE INVENTION

Problems to be Solved by the Invention

However, the following problems still remain for the above-described conventional magnetic recording head. The magnetic recording head described in the patent document 1 and 2 generates near-field light by radiating laser light from the planar laser light source to the metal scatterer, in which, in order to generate the near-field light efficiently, the laser light is required to be applied to the metal scatterer as close as possible to the tip.

On the other hand, the laser light, the lens, and the planar laser light source are required to be arranged so as not to interfere with the recording medium.

To this end, the magnetic recording head described in the patent document 1 satisfies the above-described requirements by radiating the laser light from the planar laser light source obliquely to the metal scatterer and using a semicircular-shaped lens.

However, in order to satisfy the above-described requirements, the optical axis of the laser light needs to be oblique to the metal scatterer and the semicircular-shaped lens needs to be used. This makes it difficult to generate the near-field light efficiently, and requires to increase the output level of the laser light. This may cause the planar laser light source and the metal scatterer to generate excessive heat and decrease the reliability.

Furthermore, the lens and the planar laser light source are required to be arranged in parallel spaced with a predetermined distance from the main magnetic pole. However, it is practically difficult to fabricate them in such an arrangement on the tip of the slider. Even if they can be fabricated as above, they cannot be made compact and easily downsized.

As an alternative, by using an optical waveguide in place of the planar laser light source and the lens or using a mirror, the laser light may be radiated toward the metal scatterer in a straight line. But, the configuration will be more complicated, and also, cannot be easily downsized.

Furthermore, the metal scatterer is provided outside the main magnetic pole so as to be located at the last end in the scanning direction, which makes it difficult to efficiently heat the location to which the recording magnetic field is applied when information is being recorded to the magnetic recording layer. Specifically, as the recording medium rotates, the magnetic recording layer moves under the auxiliary magnetic pole, the magnetic pole, and the metal scatterer in this order. So, the recording magnetic field is applied to the magnetic recording layer before the magnetic recording layer is heated with the near-field light. Accordingly, the location at which the heating temperature due to the near-field light reaches a peak is out of the area to which the recording magnetic field is applied, which decreases writing reliability.

In particular, the temperature gradient by the near-field light tends to lag in the scanning direction of the recording medium, which may shift the location at which the heating temperature reaches the peak from directly below the metal scatterer. Taking this into account, the actual location at which the heating temperature reaches the peak is further shifted from the area to which the recording magnetic field is applied, and then accurate writing may likely fail.

On the other hand, the magnetic recording head described in the patent document 3 includes a preheating mechanism such as a resistance heater between the main magnetic pole and the auxiliary magnetic pole, which eliminates the above-described problems of the efficiency of generating the near-field light and of writing reliability. However, disadvantageously, the configuration is further complicated and upsized due to including the preheating mechanism as an additional component.

The magnetic recording head described in the patent document 1, 2, and 3 has a coil winding structure in which a conductor is wound in a spiral shape in the same plane. The strength of the magnetic field generated along the central axis of the coil can be expressed by the following equation (1). H is the magnetic field, i is the current in the coil, and r is the distance from the central axis of the coil to the winding.

$$H = i/2r \qquad (1)$$

As the magnetic field strength H is inversely proportional to r, the longer r is, the smaller H is. Thus, there is a large difference between the strength of magnetic field generated by a winding near the central axis of the coil and that generated by a winding far from the central axis of the coil. Because of this, the loss of generated magnetic field is significant with respect to the current i, and the efficiency of generating magnetic field is relatively poor. In particular, according to the patent document 1 to 3, the tip of the magnetic pole facing the recording medium and the coil are disposed apart from each other, so the magnetic field generated by the coil may be significantly attenuated before reaching the tip of the magnetic pole, which may not increase writing reliability.

In view of the foregoing, it is an object of the present invention to provide a near-field optical head that can efficiently generate near-field light while being compact and that can efficiently generate a strong magnetic field.

Means for Solving the Problems

A near-field optical head for recording information by generating a near-field light from an introduced luminous flux to heat a magnetic recording medium rotating in a constant direction and applying a magnetic field to the magnetic recording medium to cause a flux reversal is provided, the near-field optical head being characterized by including: a slider disposed floating at a predetermined height from the surface of the magnetic recording medium and having a counter surface facing the surface of the magnetic recording medium; a near-field light generating element, formed on the counter surface and having two or more side surfaces each of which is in contact with the counter surface at a certain angle with the counter surface, for generating the near-field light; at least one lower wiring formed on at least one of the side surfaces of the near-field light generating element; a thin-film-like magnetic pole disposed to cover the lower wiring; at least one upper wiring disposed on one of the two sides of the magnetic pole, opposite to the side on which the lower wiring is disposed; at least one side surface wiring connecting the lower wiring and the upper wiring; insulating layers insulating each of the lower wiring, the magnetic pole, and the upper wiring from the others; and a coil wound around the magnetic pole by connecting the lower wiring and the upper wiring alternately and serially using the side surface wiring.

In addition, the invention is characterized in that: the near-field light generating element has an opening for generating the near-field light; the magnetic pole includes a portion of an edge surrounding the opening and includes a first magnetic pole and a second magnetic pole disposed opposite to each other; and the coil is wound around one of the first magnetic pole and the second magnetic pole.

In addition, the invention is characterized in that: the near-field light generating element has an opening for generating the near-field light; the magnetic pole includes a portion of an edge surrounding the opening and includes a first magnetic pole and a second magnetic pole disposed opposite to each other; and the coil is wound around both of the first magnetic pole and the second magnetic pole.

In addition, the invention is characterized in that: the near-field light generating element has an opening for generating the near-field light; the magnetic pole includes a first magnetic pole including a portion of an edge surrounding the opening and a second magnetic pole disposed on the counter surface of the slider; and the coil is wound around the first magnetic pole.

In addition, the invention is characterized in that the first magnetic pole and the second magnetic pole are connected by a circuit formed of a thin-film-like magnetic material, and the first magnetic pole, the second magnetic pole, and the outer wiring form a magnetic circuit structure.

In addition, the invention is characterized in that the near-field light generating element is a cone (or pyramid) or a truncated cone (or truncated pyramid), and only one portion of the outline of the bottom surface of the cone (or pyramid) or the truncated cone (or truncated pyramid) is almost perpendicular to a polarization direction of the incident light.

In addition, the invention is characterized in that the portion of the outline of the opening that is almost perpendicular to the polarization direction of the incident light is in contact with the first magnetic pole.

BEST MODE FOR CARRYING OUT THE INVENTION (Embodiment 1)

A first embodiment of a near-field optical head and an information recording/reproducing device in accordance with the present invention is described below with reference to FIGS. 1 to 6. It should be noted that an information recording/reproducing device 1 in accordance with the embodiment is described taking the case of writing to a disk (magnetic recording medium) D including a magnetic recording layer d3 using an in-plane recording method as an example.

Figure 1:
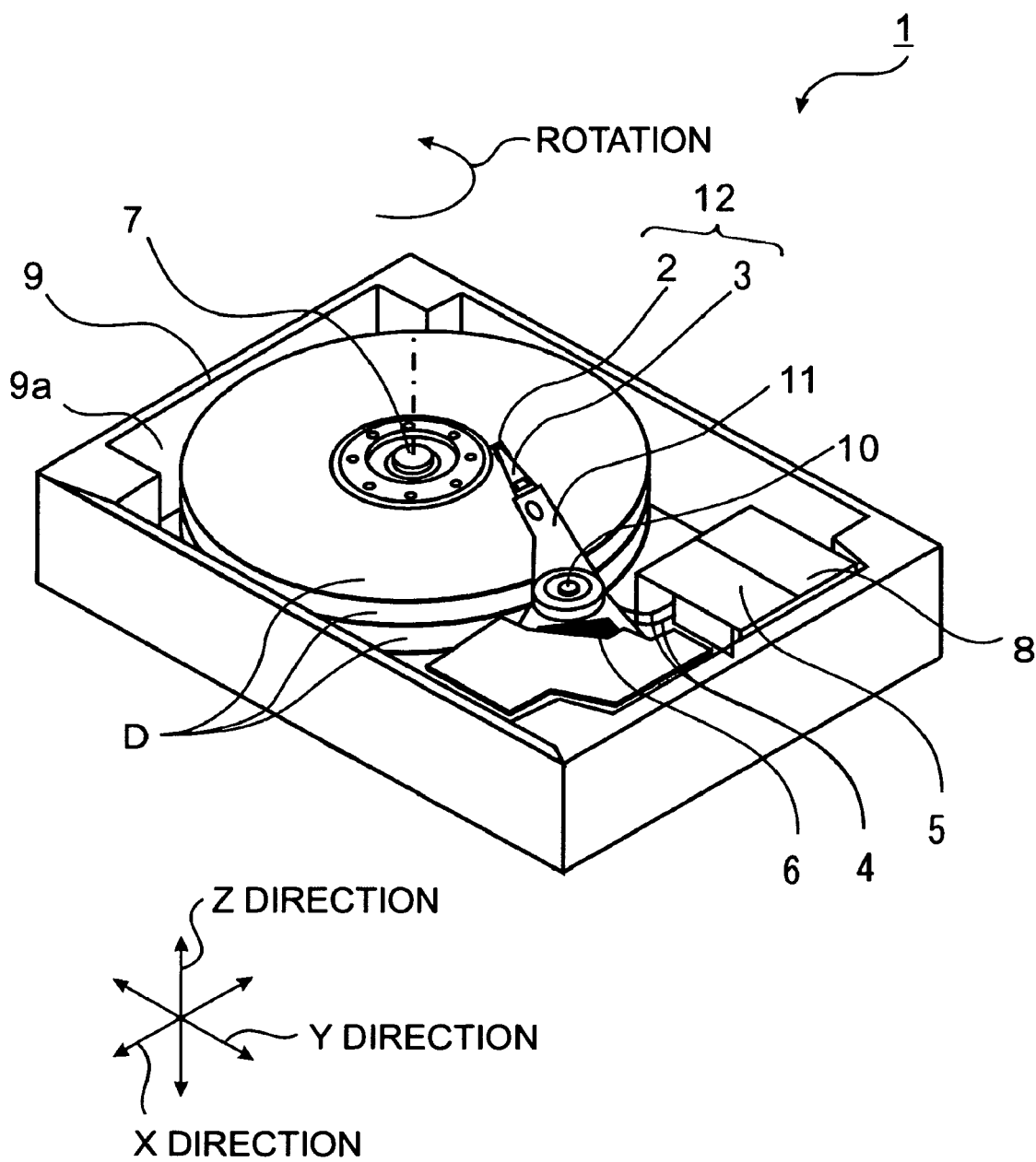
[FIG. 1] It is a schematic view of a first embodiment of an information recording/reproducing device having a near-field optical head in accordance with the present invention.

FIG. 1 is a schematic view of the information recording/reproducing device 1 in accordance with the embodiment. The information recording/reproducing device 1 includes: a near-field optical head 2; a beam 3 for supporting the near-field optical head 2 at the tip of the beam 3, the beam 3 being able to move in X and Y directions parallel to the surface of the disk D (the surface of the magnetic recording medium), and being able to rotate about two axes (X-axis, Y-axis) that are parallel to the surface of the disk D and perpendicular to each other; an optical signal controller (light source) 5 for causing a luminous flux L (shown in FIG. 2) to be incident into an optical waveguide 4 from the proximal end of the optical waveguide 4; an actuator 6 for supporting the proximal end of the beam 3 and moving the beam 3 for scanning in X and Y directions parallel to the surface of the disk D; a spindle motor (rotary driver) 7 for rotating the disk D in a constant direction; a controller 8 for supplying current modulated according to information to a coil 21 (described later) and controlling the operation of the optical signal controller 5; and a housing 9 for containing these components.

The housing 9 is formed to be a rectangular shape in plan view with metal material such as aluminum, and includes an internally formed concave portion 9a for containing the components. Also, a lid (not shown) is detachably fixed to the housing 9 so as to close the opening of the concave portion 9a. The spindle motor 7 is mounted generally at the center of the concave portion 9a. The disk D is detachably fixed by fitting its center hole to the spindle motor 7. The actuator 6 is mounted at a corner of the concave portion 9a. A carriage 11 is attached to the actuator 6 via a bearing 10. Then, the beam 3 is attached to the tip of the carriage 11. The carriage 11 and the beam 3 can be driven by the actuator 6 to move together in the X and Y directions. Note that, when the disk D stops rotating, the carriage 11 and the beam 3 is driven by the actuator 6 to leave from the disk D. The near-field optical head 2 and the beam 3 form a suspension 12. The optical signal controller 5 is mounted in the concave portion 9a next to the actuator 6. The controller 8 is mounted next to the actuator 6.

Figure 2A:
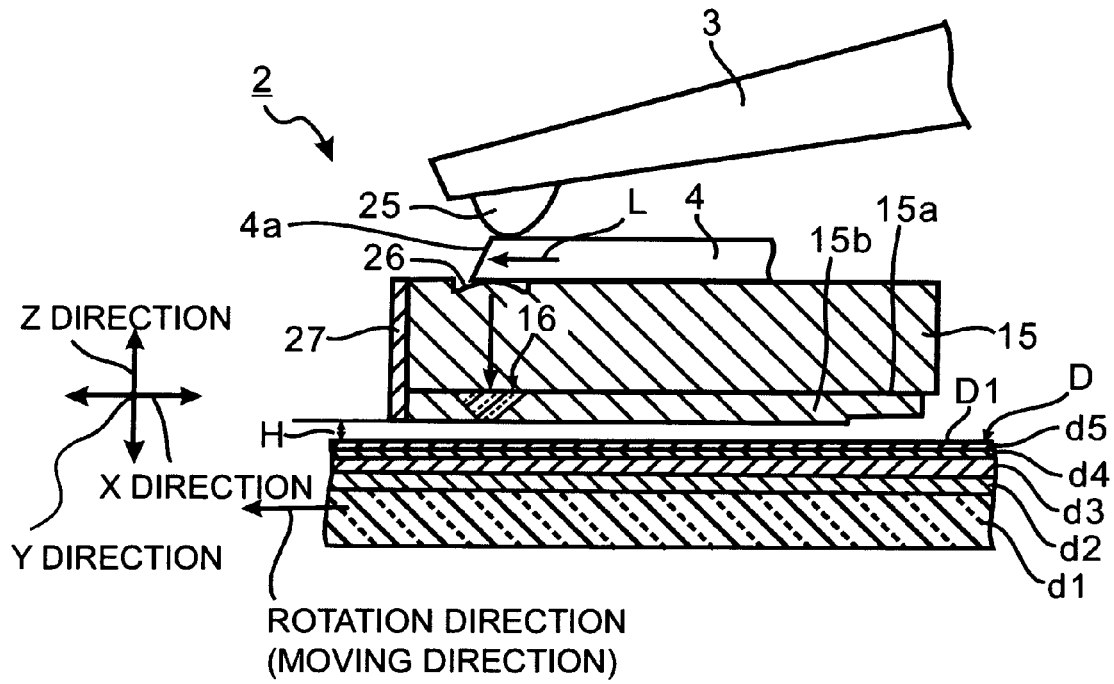
[FIG. 2] They are an enlarged cross-sectional view of the near-field optical head shown in FIG. 1 and an enlarged cross-sectional view around a core of the near-field optical head.

The detailed structure of the near-field optical head 2 is described with reference to FIGS. 2(a) and 2(b). FIG. 2(a) is a cross-sectional view of the near-field optical head 2 and the disk D. FIG. 2(a) is an enlarged view of a core 16 and its neighborhood shown in FIG. 2(a).

The near-field optical head 2 records information by generating a near-field light R from an introduced luminous flux L to heat the disk D and applying a magnetic field to the disk D to cause a flux reversal. Specifically, the near-field optical head 2 includes: a slider 15 disposed floating at a predetermined height of H from the disk surface D1 and having a counter surface 15a facing the disk surface D1; the core 16, fixed to the slider 15, for generating the near-field light R; the optical waveguide 4 and a lens 26 for introducing the luminous flux L into the core 16; a first magnetic pole 18 and a second magnetic pole 19 formed on the core 16; and a magnetic coil 20 for generating magnetic field on the magnetic pole 18.

The slider 15 is generally formed to be a rectangular parallelepiped shape of an optically transparent material such as quartz glass.

The slider 15 is supported by hanging from the tip of the beam 3 via a gimbal 25 with the counter surface 15a facing the disk D. The gimbal 25 is a component that is limited to displace only along Z-direction perpendicular to the disk surface D1, about X-axis, and about Y-axis. This makes the slider 15 rotatable about two axes (X-axis, Y-axis) parallel to the disk surface D1 and perpendicular to each other, as described above.

On the counter surface 15a of the slider 15, a convex portion 15b is formed to generate a pressure for floating the slider 15 from the viscosity of an air flow generated by the rotating disk D. In this embodiment, two convex portions 15b are formed to be like a pair of rails and to be extended in a longitudinal direction as an example. However, the slider 15 is not limited to this embodiment. As long as the slider 15 is designed to be floated in an optimal state by adjusting a positive pressure for repelling the slider 15 from the disk surface D1 and a negative pressure for attracting the slider 15 to the disk surface D1, any concave or convex shape may be used. Note that the surface of the convex portion 15b is referred to as ABS (Air Bearing Surface).

The slider 15 is subjected to a force via the two convex portions 15b for floating the slider 15 from the disk surface D1, and is also subjected to a force via the beam 3 for pushing the slider 15 toward the disk surface D1. Then the slider 15 is floated at the predetermined height of H from the disk surface D1, as described above, depending on the balance between both the forces.

Furthermore, an edge surface 16b of the core 16 is formed to be of a size suitable for generating the near-field light R when the luminous flux L is introduced into the inside of the core 16. Specifically, the opening size of the edge surface 16b of the core 16 is designed to be of a size much smaller than the wavelength of the luminous flux L (for example, a few tens of nanometers a side), which does not allow normal transmitted light to pass through, but allows the near-field light R to leak to the neighborhood.

On the top surface of the slider 15, the lens 26 is formed at the location directly above the core 16. The lens 26 is, for example, an aspherical microlens formed by performing etching using a grayscale mask. Furthermore, the optical waveguide 4 such as optical fiber is mounted on the top surface of the slider 15. The tip of the optical waveguide 4 is a mirror surface 4a cut by approximately 45 degree. The mounting location of the optical waveguide 4 is adjusted so that the mirror surface 4a will be located directly above the lens 26. Then the optical waveguide 4 is extended and connected to the optical signal controller 5 via the beam 3 and the carriage 11.

With this connection, the optical waveguide 4 can guide the luminous flux L incident from the optical signal controller 5 to the tip of the optical waveguide 4 and cause the mirror surface 4a to reflect the luminous flux L toward the lens 26. Then the reflected luminous flux L is focused by the lens 26 to pass through the slider 15 and is introduced to the bottom surface 16a of the core 16.

Figure 2B:
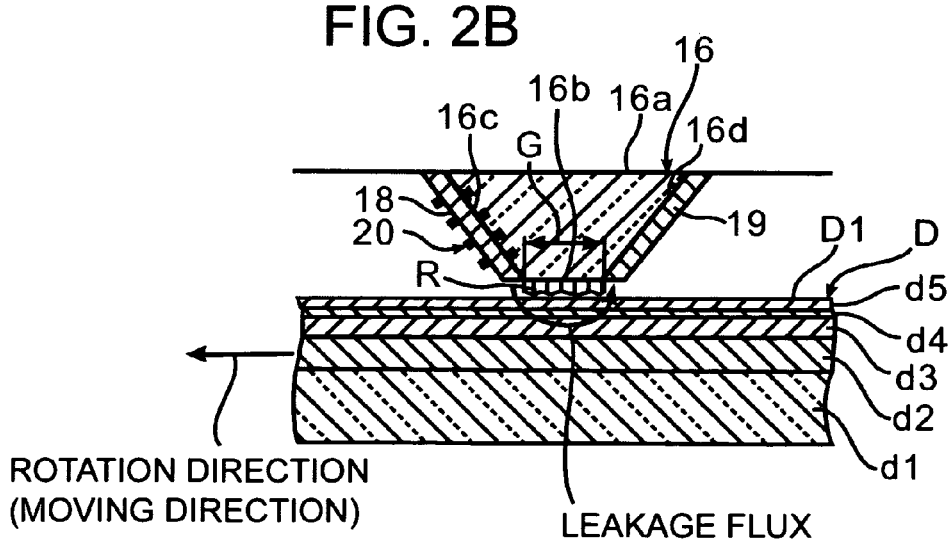
Figure 3:
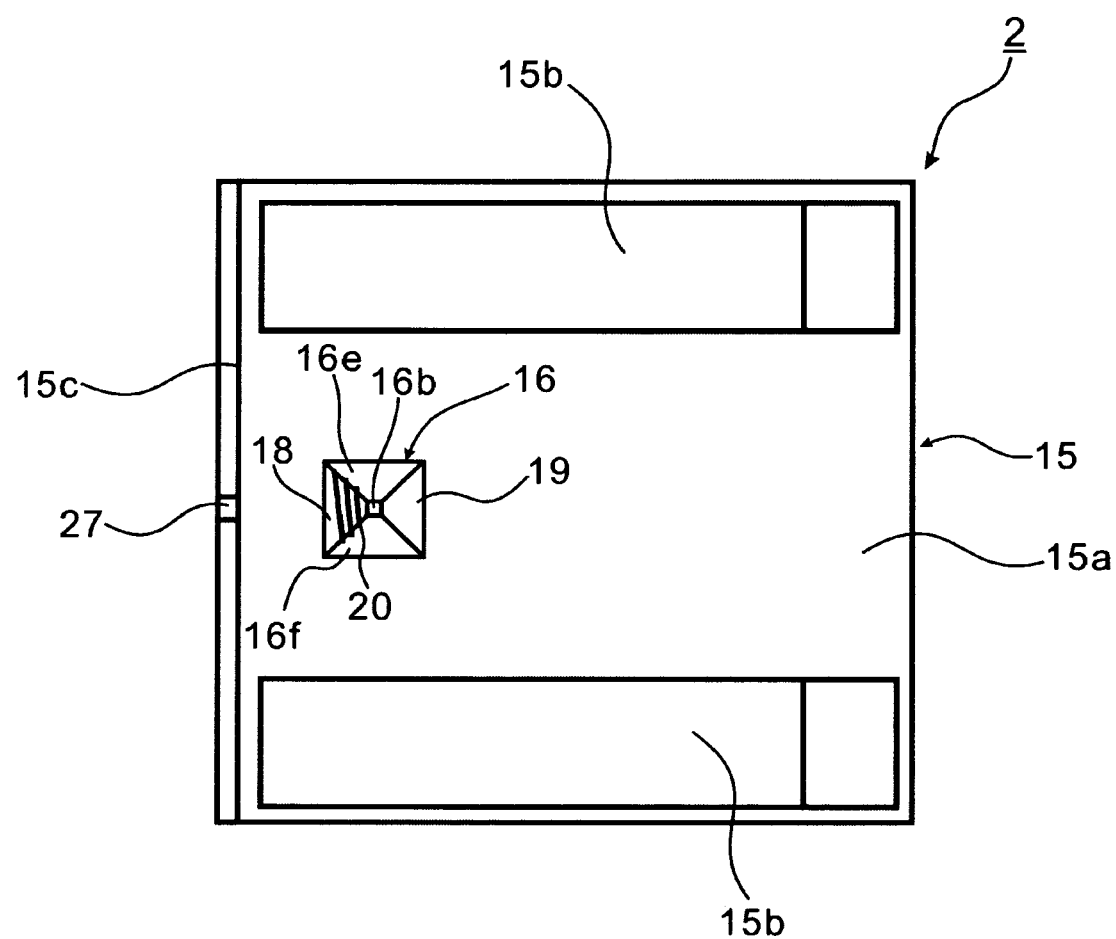
[FIG. 3] It shows the near-field optical head shown in FIG. 2 viewed from the disk surface.

On a tip surface 15c of the slider 15, as shown in FIGS. 2 and 3, a magneto-resistance effect film 27 of which electric resistance changes depending on the magnitude of the magnetic field leaking from a magnetic recording layer d3 of the disk D is formed. The magneto-resistance effect film 27 is formed generally with the same width as the edge surface 16b of the core 16. Also, the magneto-resistance effect film 27 is supplied with bias current from the controller 8 via a lead film and the like not shown. Accordingly, the controller 8 can detect the change in the magnetic field leaking from the disk D as the change in voltage, and reproduces signal based on the change in the voltage. In other words, the magneto-resistance-effect film 27 functions as a reproducing element.

The disk D in accordance with the embodiment is formed by forming a primary coat layer d2, the magnetic recording layer d3, a protective layer d4, and a lubricating layer d5 in this order on a substrate d1. The substrate d1 is, for example, an aluminum substrate, a glass substrate and the like. The primary coat layer d2 is for providing a good magnetic property even if the magnetic recording layer d3 is thin, and is formed of, for example, a Cr system alloy. The magnetic recording layer d3 is for increasing the coercivity, and is formed of, for example, a CoCr alloy such as CoCrPtTa and CoCrPtB. The protective layer d4 is for protecting the magnetic recording layer d3, and is formed of, for example, diamond-like-carbon (DLC) film. The lubricating layer d5 is formed of, for example, a fluorinated liquid lubricant.

Figure 4A:
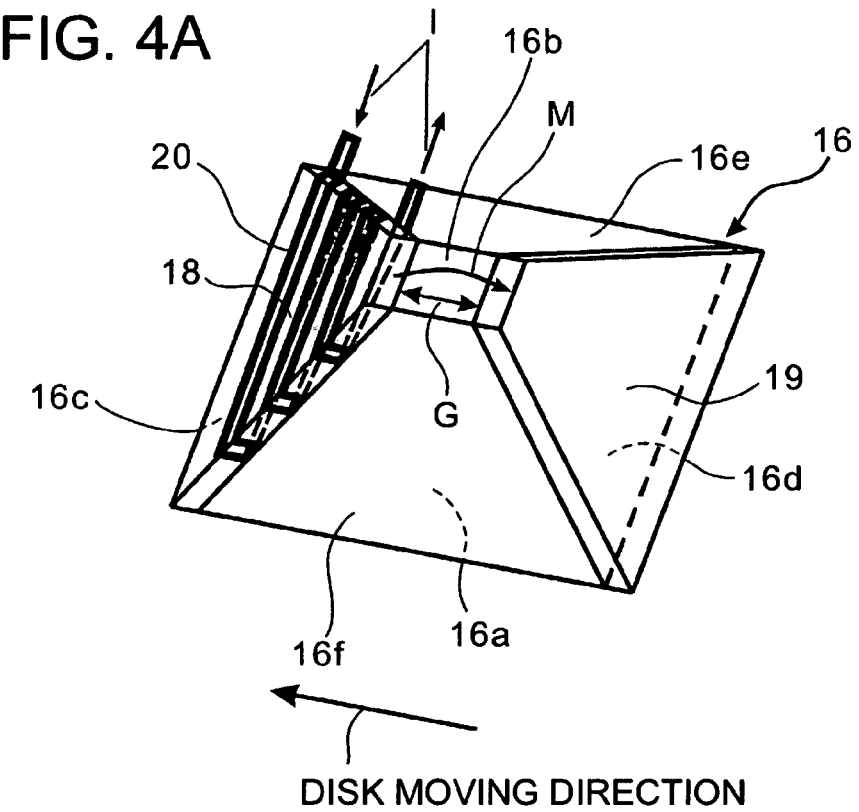
[FIG. 4] It is an enlarged perspective view of the core of the near-field optical head shown in FIG. 3 viewed from the edge surface.
Figure 4B:
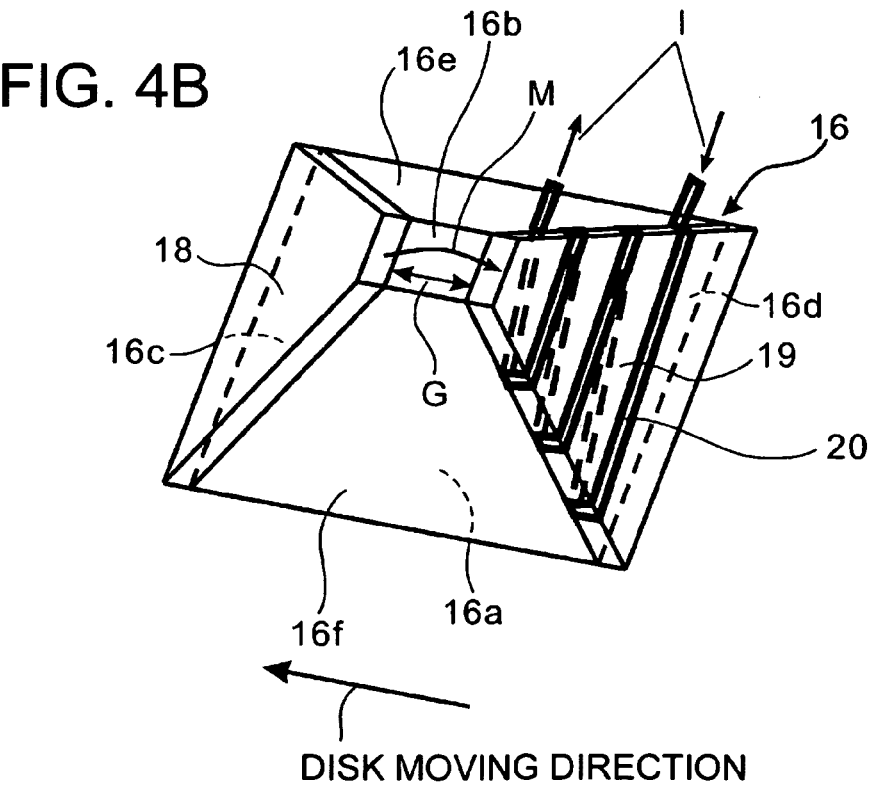

FIG. 3 shows the structure on the counter surface 15a of the near-field optical head 2. FIG. 4 is an enlarged view of the core 16. FIG. 4(a) shows the structure of the coil 20 wound around the magnetic pole 18. FIG. 4(b) shows the structure of the coil 20 wound around the magnetic pole 19.

As shown in FIGS. 3 and 4, four side surfaces 16c, 16d, 16e, and 16f are formed on the core 16. Among them, the two side surfaces 16c and 16d are arranged opposite to each other along the moving direction of the disk D. On these side surfaces 16c and 16d, the first magnetic pole 18 and the second magnetic pole 19 are formed, respectively. The magnetic poles 18 and 19 are formed on the side surfaces 16c and 16d using, for example, a thin-film forming technique such as evaporating a magnetic material. In this way, by arranging the first magnetic pole 18 and the second magnetic pole 19 opposite to each other across the opening, the area on the disk D irradiated with the near-field light can be better matched with the area on the disk D irradiated with the leakage flux from the magnetic pole, which can suppress the spreading of the near-field light and the magnetic field to increase writing reliability.

The core 16 is formed of an optically transparent material such as quartz glass, as the slider 15, and is formed to be a truncated square pyramid shape having a bottom surface 16a, the edge surface 16b, and the four side surfaces (multiple side surfaces) 16c, 16d, 16e, and 16f, as shown in FIG. 4. Specifically, the core 16 is fabricated to include: the rectangular bottom surface 16a; the edge surface 16b formed to be the same shape as the bottom surface 16a (a rectangular shape in plan view) with an area smaller than the bottom surface 16a and located spaced with a predetermined distance from the bottom surface 16a; and the four side surfaces 16c, 16d, 16e, and 16f formed by connecting the corresponding vertices of the bottom surface 16a and the edge surface 16b.

However, the core 16 is not limited to the case having the four side surfaces 16c, 16d, 16e, and 16f. The core 16 may also include: a bottom surface and an edge surface of a polygonal shape in plan view (for example, hexagonal or octagonal shape); and multiple side surfaces (for example, six side surfaces if the bottom and edge surfaces are a hexagonal shape) formed by connecting the corresponding vertices of the bottom and edge surfaces. In other words, the core 16 may be any truncated-pyramid shaped core with the bottom and edge surfaces formed to be a polygonal shape in plan view. Note that the bottom surface and the edge surface may not be the same shape. Also, the core 16 is not limited to the truncated-pyramid structure, but may be a structure having at least one side surface, for example, a stepped structure protruding from the counter surface 15a or a depressed structure.

The core 16 thus configured is fixed with the bottom surface 16a in surface contact with the counter surface 15a of the slider 15, as shown in FIG. 2. In this case, the core 16 is fixed such that the two side surfaces 16c and 16d opposite to each other are arranged along the longitudinal direction of the slider 15, that is, the moving direction of the disk D. Note that the core 16 and the slider 15 may be individually fabricated and then fixed to each other, or may be integrally fabricated of a material such as quartz glass. In particular, integrally fabricating is more preferable because it can simplify the manufacturing process and shorten the manufacturing time.

Because the bottom surface 16a is in plane contact with the counter surface 15a, the edge surface 16b of the core 16 is also parallel to the counter surface 15a of the slider 15 and the disk D. In this case, the height of the core 16 is determined such that the height of the edge surface 16b is the same as that of the convex portion 15b.

As described above, the edge surface 16b of the core 16 is formed to be the same shape as the bottom surface 16a with a size smaller than the bottom surface 16a. Accordingly, the four side surfaces 16c, 16d, 16e, and 16f are inclined surfaces in which the distance between the side surfaces 16c and 16d opposite to each other gradually decreases toward the edge surface 16b. In particular, because the size of the edge surface 16b of the core 16 is submicroscopic in order to generate the near-field light R, the distance (magnetic gap) G between the magnetic poles 18 and 19 on the edge surface 16b is very short. In other words, the very small magnetic gap G is formed.

The magnetic coil 20 is formed wound around a portion of the magnetic pole 18 in a spiral shape. In the coil 20, electrical isolation is provided between the adjacent wires and between the wires and the magnetic pole 18 to prevent a short circuit. Also, the coil 20 is electrically connected to the controller 8 via the beam 3 and the carriage 11 and is supplied from the controller 8 with current modulated according to information.

In short, the magnetic pole 18 and the coil 20 form an electromagnet as a whole. In this configuration, when a current flows in the coil 20 in the direction shown as I in FIG. 4(a), a magnetic field shown as M flows from the magnetic pole 18 to the magnetic pole 19, and a leakage flux that is needed for magnetic recording is generated. In this case, the magnetic pole 18 is a main magnetic pole, and the magnetic pole 19 is an auxiliary magnetic pole.

On the other hand, forming the coil 20 around the auxiliary magnetic pole 19 and applying a current to the coil 20 in the direction shown as I in FIG. 4(b) may also cause the magnetic field M to flow from the main magnetic pole 18 to the auxiliary magnetic pole 19.

Figure 5A:
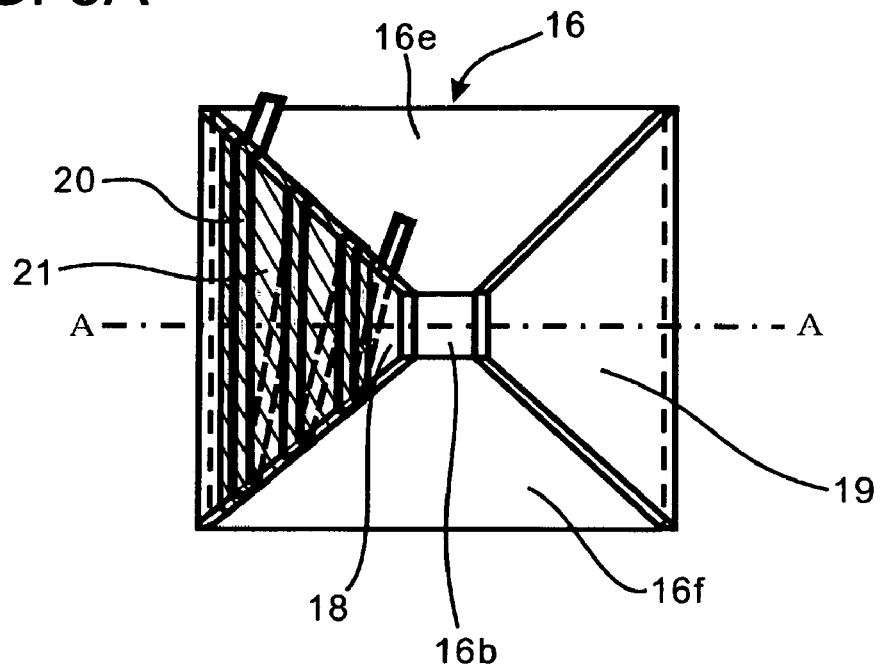
[FIG. 5] They are a detailed, enlarged top view of a magnetic recording section of the near-field optical head shown in FIG. 3 and a cross-sectional view showing the cross section of the core and coil structure.
Figure 5B:
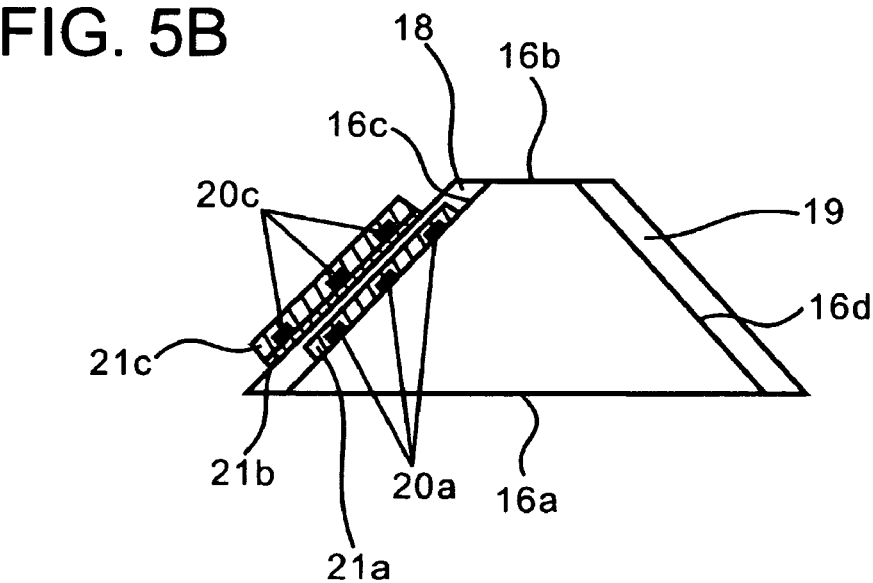

FIG. 5(a) shows in detail how the coil 20 is wound around the magnetic pole 18. FIG. 5(b) is a cross-sectional view along the line A-A' in FIG. 5(a).

The coil 20 has a structure similar to that of a coil formed by winding a conductor around a near-cylinder in a spiral shape (what is called a solenoid coil).

As shown, the coil 20 is wound around the magnetic pole 18, which is different from a conventional configuration of a coil wound in a spiral shape in the same plane. So, the coil 20 can provide overall magnetic field stronger than that of the conventional configuration. Also, the coil 20 is formed in immediate proximity to a leakage flux generating portion, which can extremely reduce loss of magnetic field. Furthermore, even if the coil 20 is a one-turn coil (single coil), magnetic field sufficient for magnetic recording can be obtained. This is because the loss of generated magnetic field in response to the current in the coil 20 is less, and stronger and more efficient magnetic field can be generated than the case of the coil structure used in a conventional magnetic recording head in which a conductor is wound in a spiral shape in the same plane. Also, the structure of a magnetism generating portion is simpler than conventional ones, which allows the head to be downsized.

Next, how the information recording/reproducing device 1 thus configured records/reproduces various information to/from the disk D is described below.

First, the spindle motor 7 is driven to rotate the disk D in a constant direction. Then the actuator 6 is activated to cause the beam 3 via the carriage 11 to scan in X and Y directions. This allows the near-field optical head 2 to be positioned to a desired location on the disk D, as shown in FIG. 1. At this time, the near-field optical head 2 is subjected to a force for floating the near-field optical head 2, via the two convex portions 15b formed on the counter surface 15a of the slider 15, and is also pushed toward the disk D with a given force by the beam 3 and the like. Then the near-field optical head 2 is floated at the predetermined height of H from the disk D, as shown in FIG. 2, depending on the balance between both the forces.

Even if the near-field optical head 2 is subject to a wind pressure generated due to the waviness of the disk D, the near-field optical head 2 can be displaced along Z-direction and about X- and Y-axes using the gimbal 25, absorbing the wind pressure due to the waviness. Accordingly, the near-field optical head 2 can be floated in a stable state.

When recording information, the controller 8 activates the optical signal controller 5 and supplies the coil 20 with current modulated according to the information.

The optical signal controller 5 causes the luminous flux L to be incident into the optical waveguide 4 from the proximal end in response to an instruction from the controller 8. The incident luminous flux L travels in the optical waveguide 4 toward the tip and turns by approximately 90 degree at the mirror surface 4a to be emitted out of the optical waveguide 4, as shown in FIG. 2. The emitted luminous flux L is focused by the lens 26 to pass through the slider 15 and be incident into the core 16 provided almost directly below the lens 26 from the bottom surface 16a. In other words, the luminous flux L is introduced from the top surface of the slider 15 to the core 16 in a straight line by a luminous flux introducing means 17.

The luminous flux L introduced into the core 16 travels from the bottom surface 16a toward the edge surface 16b, and leaks as the near-field light R to the outside from the edge surface 16b opposite to the disk surface D1 as shown in FIG. 2(b). In short, the near-field light R can be generated from the edge surface 16b of the core 16.

In this way, the luminous flux L can be introduced from the top surface of the slider 15 toward the edge surface 16b of the core 16 in an almost straight line. So, unlike the conventional way of introducing light, the luminous flux L can be easily introduced from the top surface of the slider 15, and the near-field light R can be efficiently generated. The near-field light R locally heats the magnetic recording layer d3 of the disk D to cause the coercivity to be temporarily reduced.

Note that the magnetic poles 18 and 19 formed on the side surface 16c of the core 16 are preferably formed of optically non-transparent material. This can prevent the luminous flux L from leaking to the outside of the core 16 from the side surface 16c on which the magnetic poles 18 and 19 are formed, and allows the luminous flux L to be better focused to the edge surface 16b to efficiently generate the near-field light R.

On the other hand, when the controller 8 supplies the coil 20 with a current, a magnetic field generated by the current generates a magnetic flux in the magnetic pole 18 according to the electromagnet principle, causing a magnetic field to flow from the magnetic pole 18 to the magnetic pole 19. This causes a magnetic field to leak from the magnetic gap G between the magnetic poles 18 and 19 toward the disk D, as shown in FIG. 2(b). In this case, as described above, the magnetic gap G is a very narrow gap because of both the magnetic pole 18 and 19 formed on the side surface 16c of the core 16. Accordingly, a leakage flux generated in the magnetic gap G locally acts on the magnetic recording layer d3 of the disk D.

In this way, the leakage flux can be caused to accurately act on a local location of the magnetic recording layer d3 where the coercivity is reduced by the near-field light R. Note that the direction of this leakage flux may be inverted depending on the information to be recorded.

Then in response to the leakage flux, the magnetization direction of the magnetic recording layer d3 of the disk D may be inverted depending on the direction of the leakage flux. As a result, information can be recorded to the disk D. Specifically, the information recording can be performed through the cooperation between the near-field light R and the leakage flux generated between the magnetic pole 18 and 19, that is, by using the near-field light assisted magnetic recording method.

Next, when reproducing information recorded on the disk D, the magneto-resistance effect film 27 formed on the tip surface 15c of the slider 15 receives a magnetic field leaking from the magnetic recording layer d3 of the disk D and the electric resistance of the magneto-resistance effect film 27 changes according to the magnitude of the magnetic field. Accordingly, the voltage across the magneto-resistance effect film 27 changes. In this way the controller 8 can detect the change in the magnetic field leaking from the disk D as the change in the voltage. Then the controller 8 can reproduce the information by reproducing signal from the change in voltage.

The core 16 for generating the near-field light R is provided such that the bottom surface 16a and the edge surface 16b are in parallel to the disk surface D1 and the counter surface 15a of the slider 15, which allows the luminous flux introducing means 17 to easily and reliably introduce the luminous flux L from the top surface of the slider 15.

Furthermore, both the generation of the near-field light R and the generation of the leakage magnetic field can be simultaneously achieved only by fixing the core 16 to the counter surface 15a of the slider 15 and forming the magnetic poles 18 and 19 on the side surface 16c of the core 16, which can provide a simple structure of the near-field optical head 2, rather than a complicated structure like conventional ones. Thus the configuration can be simplified and downsized. Also, the luminous flux L introduced from the bottom surface 16a of the core 16 stably travels toward the edge surface 16b, allowing the near-field light R to be efficiently generated. Thus, more efficient cooperation between the near-field light R and the leakage magnetic field can be performed.

Furthermore, unlike the conventional ones, the near-field light R can be generated between the magnetic poles 18, 19, so the location at which the heating temperature due to the near-field light R reaches a peak can be within the area on which the leakage magnetic field acts. In particular, even if the location at which the heating temperature gradient due to the near-field light R reaches a peak is shifted from the location at which the leakage magnetic field reaches a peak, the location at which the heating temperature reaches a peak can be within the area on which the leakage magnetic field acts. Accordingly, recording can be reliably performed to a local location of the disk D, which facilitates the improvement in reliability and further increases in recording density of the disk. Also, the first magnetic pole 18 and the second magnetic pole 19 are arranged along the moving direction of the disk D, which allows the magnetic pole 18 and 19 to be reliably positioned on a track of the disk D. Accordingly, information can be accurately recorded to a desired track without affecting information recorded on adjacent tracks.

Figure 6:
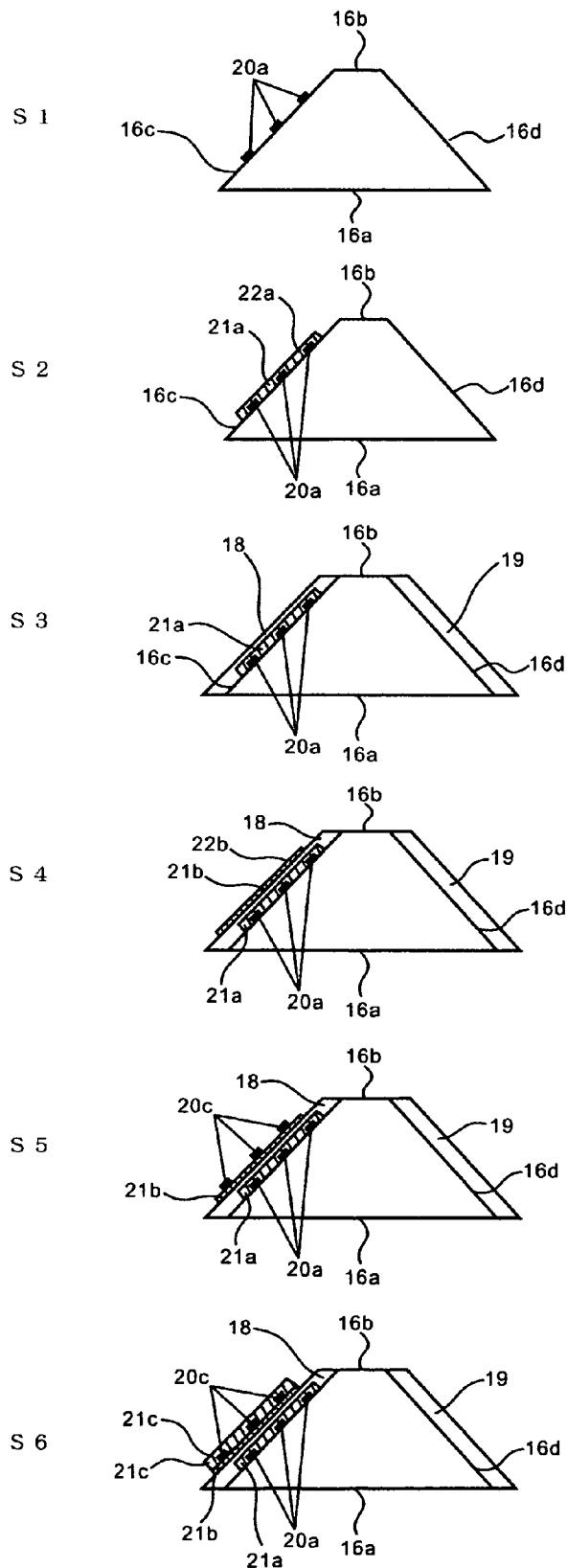
[FIG. 6] It is a cross-sectional view showing a manufacturing process of the coil structure shown in FIG. 5.

FIG. 6 is a schematic diagram of a process of manufacturing the structure in which the coil 20 is wound around the magnetic pole 18 (cross-sectional view along the line A-A' in FIG. 5).

Each of lines from S1 to S6 shows a fabricating step. First, in step S1, a lower wiring 20a is formed of a conductive material, such as Au, on the side surface 16c of the core 16 that is formed on the counter surface 15a of the slider 15. Film forming for the lower wiring 20a can be performed by means of sputtering or vacuum evaporation. Using oblique evaporation means is especially effective. The lower wiring 20a can be patterned by forming a film of the conductive material, patterning photoresist over the film, and using dry etching method or wet etching method. One alternative means for patterning the lower wiring 20a is to pattern photoresist over the side surface 16c of the core 16, form a film of a conductive material over the patterned photoresist, and then perform lift-off.

Then, in step S2, a lower insulating layer 21a is formed to be disposed between the lower wiring 20a and the magnetic pole 18. The lower insulating layer 21a can be easily formed by using, for example, photoresist such as SU-8. After forming the lower insulating layer 21a, polishing the top surface 22a of the lower insulating layer 21a is not necessary, however, through the polishing, the top surface 22a become flattened, which constantly provides a uniform film thickness and allows the precisely patterned magnetic pole 18 to be formed on the lower insulating layer 21a.

Then, in step S3, the magnetic pole 18 formed of a magnetic material, such as permalloy, is formed over the lower insulating layer 20a. Then, the magnetic pole 19 formed of a magnetic material, such as permalloy, is formed over the side surface 16d opposite to the magnetic pole 18. Film forming for the magnetic poles 18 and 19 is formed by means of sputtering or vacuum evaporation. Using oblique evaporation means is especially effective. The magnetic poles 18 and 19 can be patterned by forming a film of the magnetic material, patterning photoresist over the film, and using dry etching method or wet etching method. One alternative means for patterning the magnetic poles 18 and 19 is to pattern photoresist over the lower insulating layer 22a, form a film of a magnetic material over the patterned photoresist, and then perform lift-off.

Then, in step S4, in order to insulate the magnetic pole 18 from an upper wiring 20c, an upper insulating layer 21b is formed using almost the same material and method as those used for forming the lower insulating layer 21a. After forming the upper insulating layer 21b, polishing the top surface 22b of the upper insulating layer 21b is not necessary, however, through the polishing, the top surface 22b become flattened, which constantly provides a uniform film thickness and allows the upper wiring 20c and a side surface wiring 20b (not shown) that are precisely patterned to be formed on the top surface and side surface of the upper insulating layer 21b.

Then, in step S5, the upper wiring 20b is formed using the same material and method as those used for forming the lower wiring 20a. The upper wiring 20c and the side surface wiring 20b can be formed simultaneously using one photoresist. Or, first, the side surface wiring 20b may be formed by photoresist patterning, and then the upper wiring 20c may be formed.

Finally, in step S6, an outer insulating layer 21c wholly covering the structure fabricated in steps S1 to S6 (the lower wiring 20a, the lower insulating layer 21a, the magnetic pole 18, the upper insulating layer 21b, the upper wiring 20c, and the side surface wiring 20b) is formed using the same material and method as those used for forming the lower and upper insulating layers 21a and 21c.

As described above, the near-field optical head 2 in accordance with the embodiment can efficiently generate the near-field light R while being downsized, and can generate stronger and more efficient magnetic field, thereby improving writing reliability.

With the above-described near-field optical head 2, the information recording/reproducing device 1 in accordance with the embodiment can also be downsized, and can achieve the quality improvement of the device due to the improved writing reliability.

For the core 16 of the near-field optical head 2, metal film may be formed between the side surface 16c and the magnetic pole 18 and between the side surface 16d and the magnetic pole 19. Or metal film may be formed on side surfaces 16e and 16f rather than the side surfaces 16c and 16d on which the magnetic poles 18 and 19 are formed. From the surface of the metal films formed on the side surfaces 16c, 16d, 16e, and 16f, surface plasmons are excited and leak to the outside as high light-intensity near-field light R. The luminous flux L introduced into the core 16 does not leak to the outside of the core 16 on the way toward the edge surface 16b. Accordingly, the luminous flux L can be efficiently condensed on the edge surface 16b, and then more efficient and higher light-intensity near-field light R can be generated. As a result, the disk D can be more efficiently heated, and information recording can be more easily performed.

The above-described embodiments are described taking the case of writing using an in-plane recording method as an example, but are not limited to this method and are applicable to a perpendicular recording method.

(Embodiment 2)

Figure 7A:
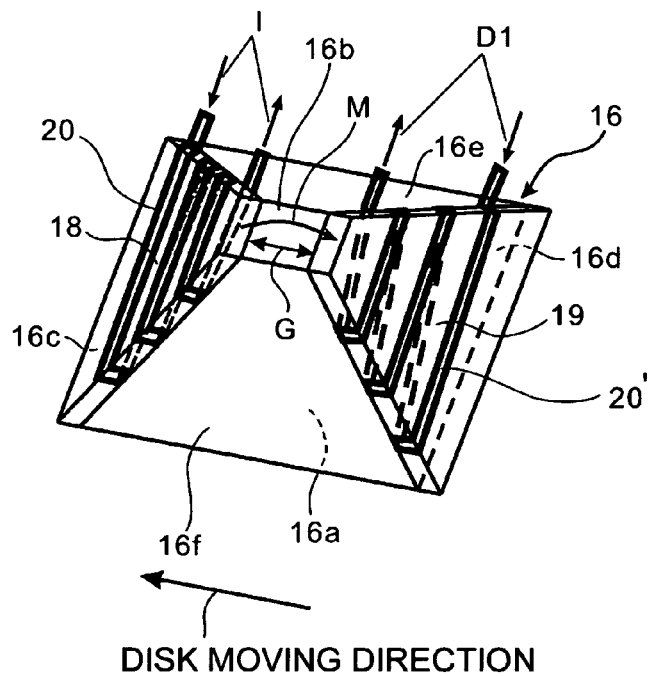
[FIG. 7] They are an enlarged perspective view viewed from the disk surface and a cross-sectional view of a magnetic recording section of a second embodiment of the near-field optical head in accordance with the invention.
Figure 7B:
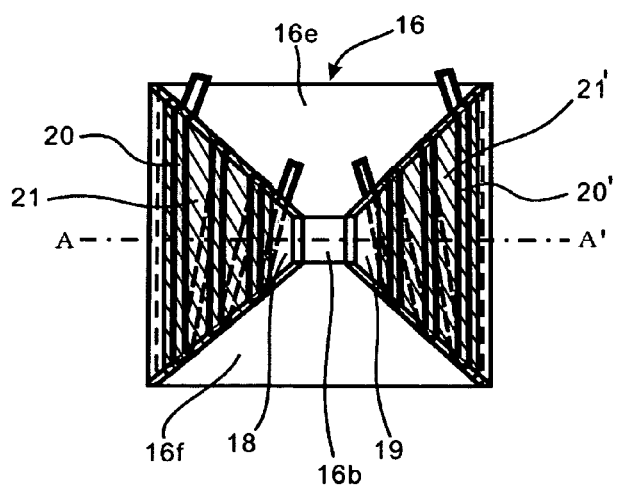
Figure 7C:
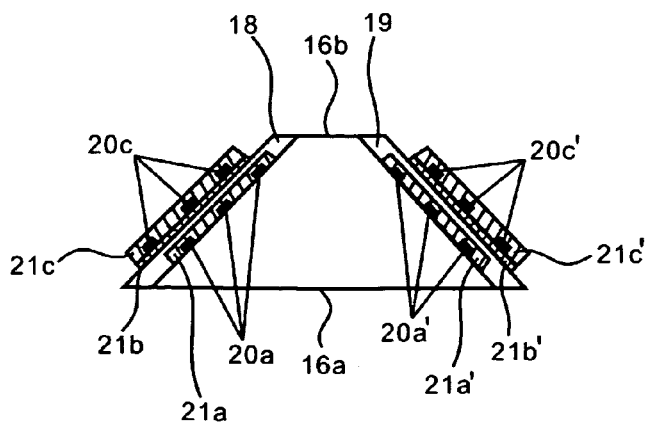

Next, a second embodiment of the near-field optical head in accordance with the invention is described with reference to FIGS. 7(a), 7(b), and 7(c). FIG. 7(a) shows a structure of a coil and a coil 20' wound around magnetic poles 18 and 19, respectively. FIG. 7(b) is a plan view of FIG. 7(a). FIG. 7(c) is a cross-sectional view along the line A-A' in FIG. 7(b). Note that, in the second embodiment, the same components as those in the first embodiment are given the same reference numerals and not repeatedly described here.

In FIGS. 4 and 5, the coil is wound around one of the magnetic poles 18 and 19. In contrast, in FIG. 7, coils are wound around both of the magnetic poles 18 and 19, and not only the magnetic pole 18 and the coil 20 but the magnetic pole 19 and the coil 20' form an electromagnet as a whole.

In comparison with the structure shown in FIGS. 4 and 5, by winding the coil 20 and 20' around the magnetic poles 18 and 19, respectively, stronger leakage magnetic field M can be generated, and the magnetic field M can be reliably caused to flow from the main magnetic pole 18 to the auxiliary magnetic pole 19, which provides more stable magnetic recording.

Even if the coils wound around the magnetic poles 18 and 19 are one-turn coils, the magnetic field M sufficient for magnetic recording can be obtained.

Also, for the manufacturing process, only by providing patterns for fabricating two or more coils and insulating layers to a photomask used for fabricating the structure shown in FIGS. 4 and 5, the structure shown in FIG. 7 can be efficiently fabricated using almost the same method as the fabricating method of the structure shown in FIGS. 4 and 5 without increasing the fabricating steps.

(Embodiment 3)

Figure 8A:
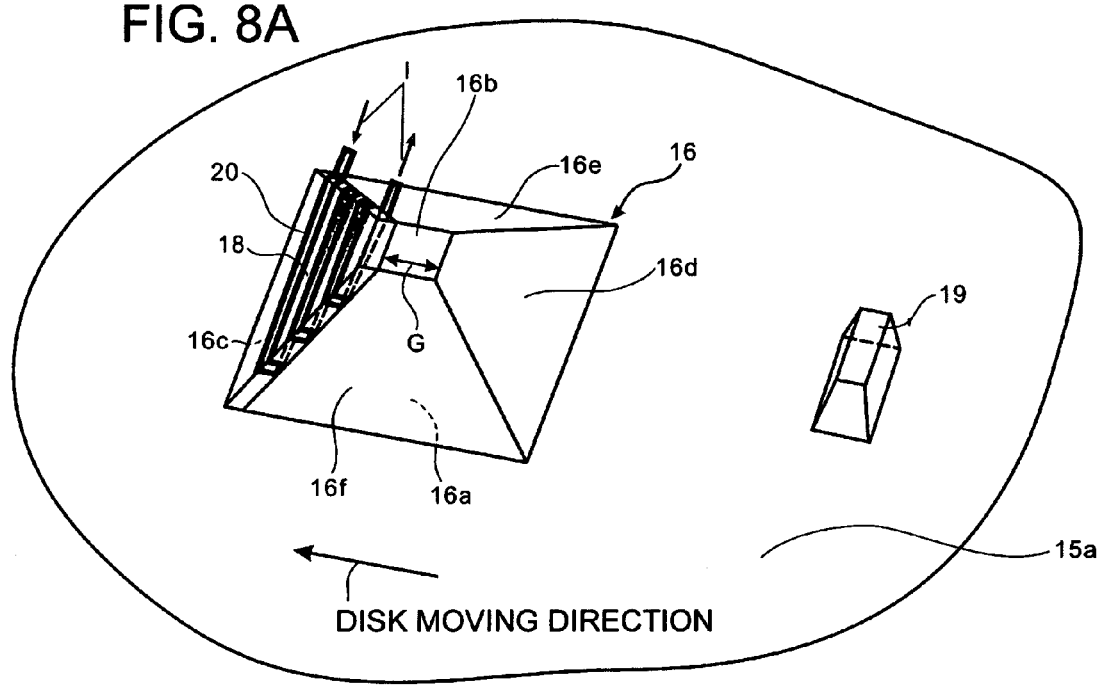
[FIG. 8] They are enlarged perspective views viewed from the disk surface of a magnetic recording section of a third embodiment of the near-field optical head in accordance with the invention.
Figure 8B:
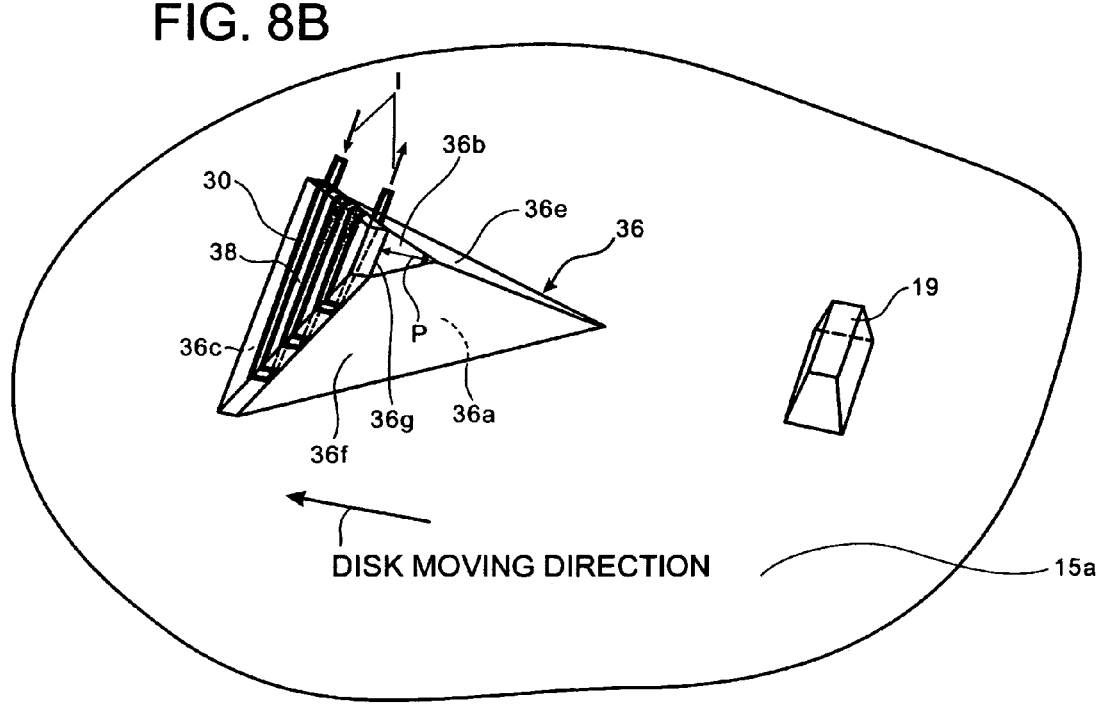

Next, a third embodiment of the near-field optical head in accordance with the invention is described with reference to FIGS. 8(a) and 8(b). FIG. 8(a) shows an example of the case that a core 16 is a truncated square pyramid. FIG. 8(b) shows an example of the case that a core 16 is a truncated triangular pyramid. Note that, in the third embodiment, the same components as those in the first and second embodiments are given the same reference numerals and not repeatedly described here.

In FIGS. 4 and 5 or in FIG. 7, the magnetic poles 18 and 19 are formed on the side surfaces 16c and 16d of the core 16, respectively. In contrast, the structure shown in FIGS. 8(a) and 8(b) is what is called a single-pole structure, in which only a magnetic pole 18 is formed as main magnetic pole on a side surface 16c of the core 16, and a coil is wound around the magnetic pole 18. A magnetic pole 19' functioning as the auxiliary magnetic pole is provided on a counter surface 15a on which a core 16 is disposed. The magnetic pole 19' may be located anywhere on the counter surface 15a as long as the location is such that leakage magnetic field M (not shown) flows from the magnetic pole 18 to the magnetic pole 19' in the direction almost opposite to the moving direction of a disk D.

The structure shown in FIGS. 8(a) and 8(b) is limited to the case of using a perpendicular magnetic recording method, and is applicable if a near-field light generating element is of a protruding or depressed structure having at least one side surface. This structure has a high degree of design freedom, such as a near-field light generating element and magnetic poles 18, 19, and 19' according to the structure of a slider 15.

For the manufacturing process, the magnetic pole 19' may be separately provided after fabricating the structure shown in FIGS. 4 and 5 or in FIG. 7 except forming the magnetic pole 19. Or the magnetic pole 19' may be formed simultaneously with forming the magnetic pole 18 by adding a pattern of the magnetic pole 19' to a photomask used for forming the magnetic pole 18.

FIG. 8(*b*) shows a structure in which a truncated triangular pyramid is used as a core 36, which is an example of the case that only one portion of the outline of a edge surface 36*d* of the core 36 is almost perpendicular to a polarization direction P of an incident light L. In the structure shown in FIG. 8(*b*), the polarization direction P of the incident light L is controlled to be almost perpendicular to an outline 36*g* of the edge surface 36*d*. Also, the outline 36*g* is in contact with a magnetic pole 38.

Accordingly, in comparison with the structure shown in FIGS. 4 and 5 or in FIG. 7, this structure can generate near-field light R having high energy further localized to the neighborhood of the magnetic pole 38, and then can provide thermal assistance to an ultramicro area, which is suitable for ultrahigh-density information recording.

(Embodiment 4)

Next, a third embodiment of the near-field optical head in accordance with the invention is described with reference to FIG. 9. Note that, in the fourth embodiment, the same components as those in the first, second, and third embodiments are given the same reference numerals and not repeatedly described here.

Figure 9A:
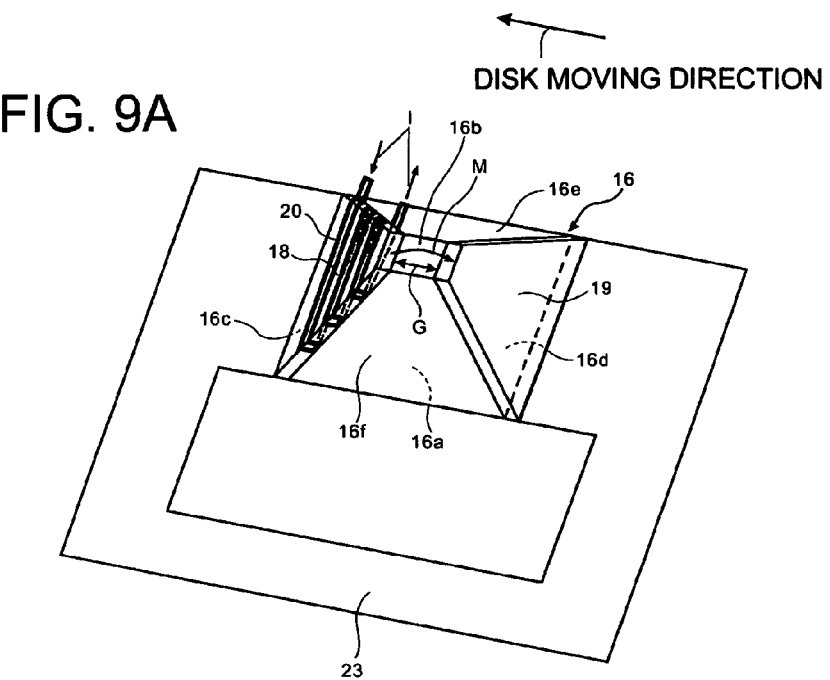
[FIG. 9] They are enlarged perspective views viewed from the disk surface of a magnetic recording section of a fourth embodiment of the near-field optical head in accordance with the invention.
Figure 9B:
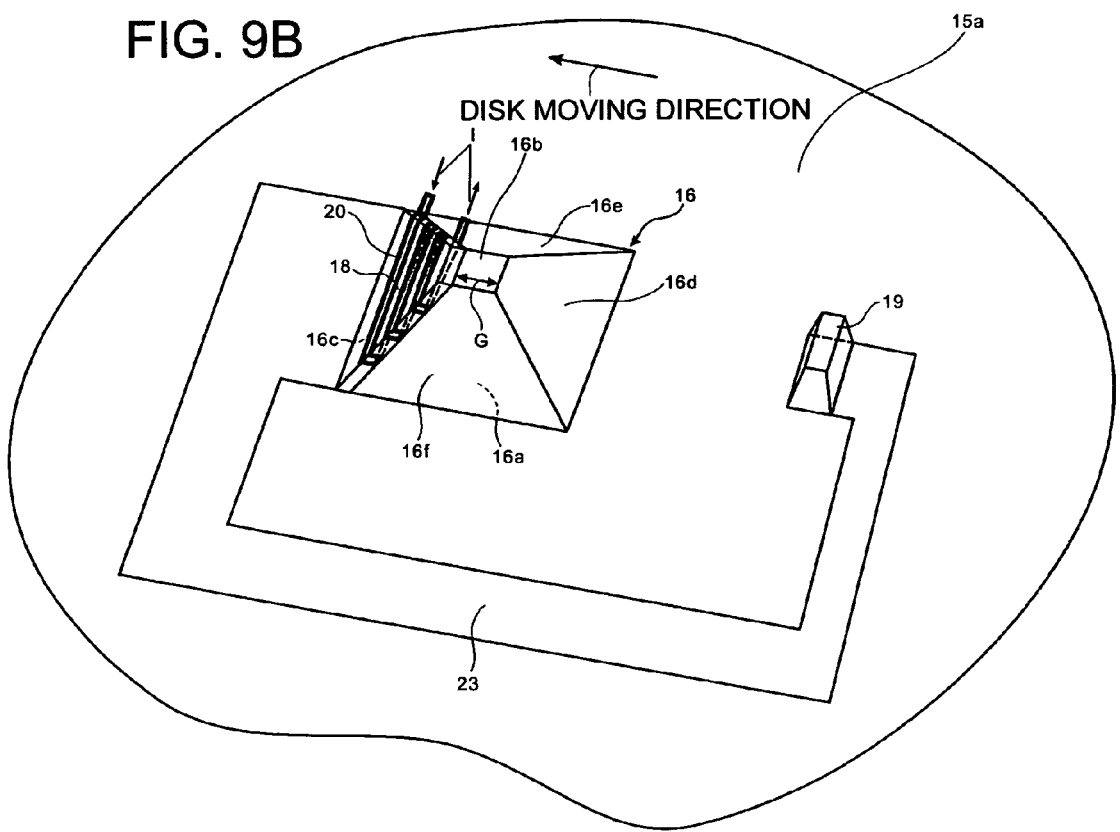

FIG. 9 shows an example of a structure in which the magnetic poles 18 and 19 or the magnetic poles 18 and 19' of the structure shown in FIGS. 4, 7, and 8 are connected by a thin-film-like circuit 23. The circuit 23 is formed of a magnetic material similar to that of the magnetic poles 18 and 19 or the magnetic poles 18 and 19'.

In the structure shown in FIG. 9(*a*), the magnetic poles 18 and 19 of the structure shown in FIG. 4(*a*) are connected by the circuit 23. In the structure shown in FIG. 9(*b*), the magnetic poles 18 and 19' of the structure shown in FIG. 8(*a*) are connected by the circuit 23. In the structure shown in FIG. 9, the magnetic poles and the circuit 23 form a complete magnetic circuit structure, which allows magnetic field M to be caused to flow efficiently from the magnetic pole 18 to the magnetic pole 19 (or 19').

The circuit 23 can be easily fabricated simultaneously with forming the magnetic poles 18 and 19 or the magnetic poles 18 and 19' by adding a pattern of the circuit 23 to a photomask used for patterning the magnetic poles 18 and 19 or the magnetic poles 18 and 19'.

Industrial Applicability

A near-field optical head in accordance with the present invention can efficiently generate a near-field light while being downsized, and can generate stronger and more efficient magnetic field.

The invention claimed is:

1. A near-field optical head for recording information by generating a near-field light from an introduced luminous flux to heat a magnetic recording medium rotating in a constant direction and applying a magnetic field to the magnetic recording medium to cause a flux reversal, characterized by including:

a slider disposed floating at a predetermined height from the surface of the magnetic recording medium and having an counter surface facing the surface of the magnetic recording medium;

a near-field light generating element, formed on the counter surface and having two or more side surfaces each of which are in contact with the counter surface at a certain angle with the counter surface, for generating the near-field light from the top portion of the two or more side surfaces;

at least one lower wiring formed on at least one of the side surfaces of the near-field light generating element;

a thin-film-like magnetic pole disposed to cover the lower wiring;

at least one upper wiring disposed on one of the two sides of the magnetic pole, opposite to the side on which the lower wiring is disposed;

at least one side surface wiring connecting the lower wiring and the upper wiring;

insulating layers insulating each of the lower wiring, the magnetic pole, and the upper wiring from the others; and a coil wound around the magnetic pole by connecting the lower wiring and the upper wiring alternately and serially using the side surface wiring.

2. The near-field optical head according to claim 1, characterized in that:

the near-field light generating element has an opening for generating the near-field light;

the magnetic pole includes a portion of an edge surrounding the opening and includes a first magnetic pole and a second magnetic pole disposed opposite to each other; and the coil is wound around one of the first magnetic pole and the second magnetic pole.

3. The near-field optical head according to claim 1, characterized in that:

the near-field light generating element has an opening for generating the near-field light;

the magnetic pole includes a portion of an edge surrounding the opening and includes a first magnetic pole and a second magnetic pole disposed opposite to each other; and the coil is wound around both of the first magnetic pole and the second magnetic pole.

4. The near-field optical head according to claim 1, characterized in that:

the near-field light generating element has an opening for generating the near-field light;

the magnetic pole includes a first magnetic pole including a portion of an edge surrounding the opening and a second magnetic pole disposed on the counter surface of the slider; and the coil is wound around the first magnetic pole.

5. The near-field optical head according to claim 4, characterized in that the near-field light generating element is a cone or a truncated cone, and only one portion of the outline of the opening of the top surface of the cone or the truncated cone is almost perpendicular to a polarization direction of the incident light.

6. The near-field optical head according to claim 5, characterized in that the portion of the outline of the opening that is almost perpendicular to the polarization direction of the incident light is in contact with the first magnetic pole.

* * * * *